(12) United States Patent
Newman et al.

(10) Patent No.: US 10,049,669 B2
(45) Date of Patent: Aug. 14, 2018

(54) CONFIGURABLE SPEECH RECOGNITION SYSTEM USING MULTIPLE RECOGNIZERS

(75) Inventors: Michael Newman, Somerville, MA (US); Anthony Gillet, Wilmington, MA (US); David Mark Krowitz, Reading, MA (US); Michael D. Edgington, Bridgewater, MA (US)

(73) Assignee: Nuance Communications, Inc., Burlington, MA (US)

( * ) Notice: Subject to any disclaimer, the term of this patent is extended or adjusted under 35 U.S.C. 154(b) by 948 days.

(21) Appl. No.: 13/345,173

(22) Filed: Jan. 6, 2012

(65) Prior Publication Data

US 2012/0179463 A1    Jul. 12, 2012

Related U.S. Application Data

(60) Provisional application No. 61/430,907, filed on Jan. 7, 2011.

(51) Int. Cl.
*G10L 15/30* (2013.01)
*G10L 15/32* (2013.01)
*G10L 17/00* (2013.01)
*G10L 15/22* (2006.01)

(52) U.S. Cl.
CPC ............ *G10L 15/30* (2013.01); *G10L 15/32* (2013.01); *G10L 15/22* (2013.01); *G10L 17/005* (2013.01)

(58) Field of Classification Search
CPC .......... G10L 15/30; G10L 15/22; G10L 15/00
USPC ..................... 704/231, 270.1, 275
See application file for complete search history.

(56) References Cited

U.S. PATENT DOCUMENTS

| 4,712,189 A | 12/1987 | Mohri |
| 5,054,082 A | 10/1991 | Smith et al. |
| 5,148,471 A | 9/1992 | Metroka et al. |
| 5,297,183 A | 3/1994 | Bareis et al. |
| 5,544,228 A | 8/1996 | Wagner et al. |
| 5,594,789 A | 1/1997 | Seazholtz et al. |

(Continued)

FOREIGN PATENT DOCUMENTS

| EP | 0 450 610 A2 | 10/1991 |
| EP | 0 654 930 A1 | 5/1995 |

(Continued)

OTHER PUBLICATIONS

U.S. Appl. No. 12/386,166, filed Apr. 14, 2009, Stephane H. Maes.

(Continued)

*Primary Examiner* — Douglas Godbold
*Assistant Examiner* — Mark Villena
(74) *Attorney, Agent, or Firm* — Wolf, Greenfield & Sacks, P.C.

(57) ABSTRACT

Techniques for combining the results of multiple recognizers in a distributed speech recognition architecture. Speech data input to a client device is encoded and processed both locally and remotely by different recognizers configured to be proficient at different speech recognition tasks. The client/server architecture is configurable to enable network providers to specify a policy directed to a trade-off between reducing recognition latency perceived by a user and usage of network resources. The results of the local and remote speech recognition engines are combined based, at least in part, on logic stored by one or more components of the client/server architecture.

22 Claims, 6 Drawing Sheets

(56) References Cited

U.S. PATENT DOCUMENTS

| | | |
|---|---|---|
| 5,632,002 A | 5/1997 | Hashimoto et al. |
| 5,774,857 A | 6/1998 | Newlin |
| 5,855,003 A | 12/1998 | Ladden et al. |
| 5,943,648 A | 8/1999 | Tel |
| 5,953,700 A | 9/1999 | Kanevsky et al. |
| 5,956,683 A | 9/1999 | Jacobs et al. |
| 5,960,399 A | 9/1999 | Barclay et al. |
| 6,078,886 A | 6/2000 | Dragosh et al. |
| 6,088,732 A | 7/2000 | Smith et al. |
| 6,094,680 A | 7/2000 | Hokanson |
| 6,098,041 A | 8/2000 | Matsumoto |
| 6,119,087 A | 9/2000 | Kuhn et al. |
| 6,173,259 B1 | 1/2001 | Bijl et al. |
| 6,188,985 B1 | 2/2001 | Thrift et al. |
| 6,195,641 B1 | 2/2001 | Loring et al. |
| 6,216,013 B1 | 4/2001 | Moore et al. |
| 6,282,268 B1 | 8/2001 | Hughes et al. |
| 6,282,508 B1 | 8/2001 | Kimura et al. |
| 6,327,568 B1 | 12/2001 | Joost |
| 6,363,348 B1 | 3/2002 | Besling et al. |
| 6,366,886 B1 | 4/2002 | Dragosh et al. |
| 6,374,226 B1 | 4/2002 | Hunt et al. |
| 6,408,272 B1 | 6/2002 | White et al. |
| 6,424,945 B1 | 7/2002 | Sorsa |
| 6,434,523 B1 | 8/2002 | Monaco |
| 6,453,290 B1 | 9/2002 | Jochumson |
| 6,456,974 B1 | 9/2002 | Baker et al. |
| 6,487,534 B1 | 11/2002 | Thelen et al. |
| 6,560,590 B1 | 5/2003 | Shwe et al. |
| 6,594,628 B1 | 7/2003 | Jacobs et al. |
| 6,604,075 B1 | 8/2003 | Brown et al. |
| 6,604,077 B2 | 8/2003 | Dragosh et al. |
| 6,615,171 B1 | 9/2003 | Kanevsky et al. |
| 6,615,172 B1 | 9/2003 | Bennett et al. |
| 6,671,669 B1 | 12/2003 | Garudadri et al. |
| 6,738,743 B2 | 5/2004 | Sharma et al. |
| 6,760,705 B2 | 7/2004 | Dvorak |
| 6,832,380 B1 | 12/2004 | Lau et al. |
| 6,912,588 B1 | 6/2005 | Jardin et al. |
| 6,963,759 B1 | 11/2005 | Gerson |
| 7,003,463 B1 | 2/2006 | Maes et al. |
| 7,024,363 B1 | 4/2006 | Comerford et al. |
| 7,050,977 B1 | 5/2006 | Bennett |
| 7,058,643 B2 | 6/2006 | Vailaya |
| 7,058,890 B2 | 6/2006 | George et al. |
| 7,099,824 B2 | 8/2006 | Kushida et al. |
| 7,137,126 B1 | 11/2006 | Coffman et al. |
| 7,366,673 B2 | 4/2008 | Ruback et al. |
| 7,389,234 B2 | 6/2008 | Schmid et al. |
| 7,418,382 B1 | 8/2008 | Maes |
| 7,519,536 B2 | 4/2009 | Maes et al. |
| 7,610,204 B2 | 10/2009 | Ruback et al. |
| 7,729,916 B2 | 6/2010 | Coffman et al. |
| 8,082,153 B2 | 12/2011 | Coffman et al. |
| 8,332,227 B2 | 12/2012 | Maes et al. |
| 8,868,425 B2 | 10/2014 | Maes et al. |
| 8,898,065 B2 | 11/2014 | Newman et al. |
| 8,930,194 B2 | 1/2015 | Newman et al. |
| 9,196,252 B2 | 11/2015 | Ruback et al. |
| 2002/0065660 A1 | 5/2002 | Cooklev et al. |
| 2002/0077811 A1 | 6/2002 | Koenig et al. |
| 2002/0091515 A1 | 7/2002 | Garudadri |
| 2002/0091527 A1 | 7/2002 | Shiau |
| 2003/0004720 A1 | 1/2003 | Garudadri et al. |
| 2003/0046074 A1 | 3/2003 | Ruback et al. |
| 2003/0120486 A1* | 6/2003 | Brittan et al. ............ 704/231 |
| 2003/0125955 A1 | 7/2003 | Arnold et al. |
| 2003/0139924 A1 | 7/2003 | Balasuriya |
| 2004/0010409 A1 | 1/2004 | Ushida et al. |
| 2004/0083109 A1* | 4/2004 | Halonen .............. G10L 15/30 704/277 |
| 2005/0049860 A1 | 3/2005 | Junqua et al. |
| 2005/0131704 A1 | 6/2005 | Dragosh et al. |
| 2006/0009980 A1* | 1/2006 | Burke .................. G10L 15/30 704/270 |
| 2006/0149551 A1 | 7/2006 | Ganong et al. |
| 2006/0195323 A1 | 8/2006 | Monne et al. |
| 2006/0235684 A1* | 10/2006 | Chang .................. G10L 15/30 704/233 |
| 2007/0011010 A1 | 1/2007 | Dow et al. |
| 2007/0276651 A1 | 11/2007 | Bliss et al. |
| 2007/0286099 A1* | 12/2007 | Stocklein et al. ............ 370/259 |
| 2008/0027723 A1 | 1/2008 | Reding et al. |
| 2008/0126490 A1* | 5/2008 | Ahlenius ......... H04M 1/72519 709/206 |
| 2008/0154612 A1 | 6/2008 | Evermann et al. |
| 2008/0154870 A1 | 6/2008 | Evermann et al. |
| 2008/0189111 A1 | 8/2008 | Ruback et al. |
| 2009/0051649 A1* | 2/2009 | Rondel ........................ 345/156 |
| 2009/0204410 A1* | 8/2009 | Mozer .................. G10L 15/30 704/275 |
| 2009/0253463 A1* | 10/2009 | Shin ................. H04M 1/72583 455/563 |
| 2009/0287477 A1 | 11/2009 | Maes |
| 2010/0049521 A1 | 2/2010 | Ruback et al. |
| 2011/0015928 A1* | 1/2011 | Odell .................. G10L 15/30 704/257 |
| 2011/0060587 A1 | 3/2011 | Phillips et al. |
| 2012/0030712 A1 | 2/2012 | Chang |
| 2012/0035932 A1* | 2/2012 | Jitkoff et al. ............. 704/254 |
| 2012/0179457 A1 | 7/2012 | Newman et al. |
| 2012/0179464 A1 | 7/2012 | Newman et al. |
| 2012/0179469 A1 | 7/2012 | Newman et al. |
| 2012/0179471 A1 | 7/2012 | Newman et al. |
| 2013/0006620 A1 | 1/2013 | Maes et al. |
| 2014/0343948 A1 | 11/2014 | Maes et al. |

FOREIGN PATENT DOCUMENTS

| | | |
|---|---|---|
| GB | 2325112 A | 11/1998 |
| JP | 09-098221 A | 4/1997 |
| JP | 10-207683 A | 8/1998 |
| JP | 10-214258 A | 8/1998 |
| JP | 10-228431 A | 8/1998 |
| WO | WO 97/47122 A2 | 12/1997 |

OTHER PUBLICATIONS

U.S. Appl. No. 13/345,198, filed Jan. 6, 2012, Newman et al.
U.S. Appl. No. 13/345,219, filed Jan. 6, 2012, Newman et al.
U.S. Appl. No. 13/345,238, filed Jan. 6, 2012, Newman et al.
U.S. Appl. No. 13/345,265, filed Jan. 6, 2012, Newman et al.
Gopalakrishnan, Compression of acoustic features for speech recognition in network environments. Proceedings of the 1998 International Conference on Acoustics, Speech and Signal Processing, May 12-15, 1998, vol. 2, pp. 977-980.

* cited by examiner

CONFIGURABLE SPEECH RECOGNITION SYSTEM USING MULTIPLE RECOGNIZERS

CROSS-REFERENCE TO RELATED APPLICATIONS

This application claims priority to U.S. Provisional Application No. 61/430,907 filed Jan. 7, 2011 which is incorporated herein by reference.

BACKGROUND

In recent years, the availability of voice interfaces for electronic devices using automated speech recognition (ASR) has become more common. Voice interfaces enable a user to use speech including voice commands to interact with one or more components of an electronic device. For example, a user may interact with a speech-enabled cellular phone to effectuate voice activated dialing or the user may interact with a speech enabled device to compose and send a text message. The addition of voice control as a separate input interface provides users with more flexible communication options when using electronic devices and reduces the reliance on other input devices such as mini keyboards and touch screens that may be more cumbersome to use in particular situations.

SUMMARY

One embodiment is directed to methods and apparatus for combining speech recognition results from a local recognizer and a network-based recognizer processing the same audio of different qualities. For example, the audio transmitted to and recognized by the network-based recognizer may be compressed and/or degraded.

Another embodiment is directed to methods and apparatus for combining speech recognition results from multiple recognizers using a priori weights assigned to each recognizer, wherein the a priori weights are determined based on the recognizer's anticipated proficiency performing particular recognition task(s).

Another embodiment is directed to a distributed ASR environment comprising local- and network-based recognizers. In the distributed ASR environment, local speech recognition may be facilitated by using user and/or device-specific knowledge source(s) (e.g., contact lists, recent calls, etc.) that may not be available to the network-based recognizer. For example, the user and/or device specific knowledge source(s) may be used to constrain the grammar used by the local ASR engine and/or to constrain the recognition vocabulary used by the local ASR engine.

Another embodiment is directed to a distributed ASR environment comprising local- and network-based recognizers. In the distributed ASR environment, recognition by the local ASR engine may be improved by training the local ASR engine using results frequently returned from the network ASR engine.

Another embodiment is directed to a distributed ASR environment comprising local and network-based recognizers configured to perform parallel speech recognition. Because the result from the local ASR engine may be faster, a partial action (e.g., opening up a text message editor) may be performed based on local ASR result, and the action may be completed (e.g., filling in the message body text) when the network-based ASR result is received. By performing a partial action, the user may be able to determine whether the recognition by the local ASR engine was correct prior to receiving the full result from the network ASR engine.

Another embodiment is directed to identifying multiple types of information (e.g., command type, name, location, message body) in single user utterance without directed prompts to recognize the utterance using a distributed speech recognition system where different parts of the utterance are processed by different recognizers.

Another embodiment is directed to determining at runtime whether a network-based recognizer is needed for speech recognition by identifying a generic speech node in one or more active recognition grammar(s) being used by a local speech recognition engine. For example, all nodes in a search tree for the active grammar(s) may be used to determine a likelihood that the network-based recognizer is needed rather than relying on an a priori decision about where to send audio.

Another embodiment is directed to reducing perceived user latency caused, at least in part, by a delay in sending audio to the network ASR engine. The perceived user latency is reduced by simultaneously performing local ASR while buffering the audio in a compressed form so that the compressed audio is ready for transmission to the network as soon as it is determined, based on the local ASR, that network-based ASR is required. That is, the audio data may be prepared to be sent to the network ASR prior to establishing that the network ASR will be required for speech recognition.

Another embodiment is directed to configuring a speech recognition system operation such as usage of network resources or perceived user latency based on a policy specified by a network provider. For example, a determination regarding when to establish and/or close a network connection and/or when to send audio to network ASR engine may be based, at least in part on the policy specified by a network provider.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

When a speech-enabled electronic device receives speech input from a user, an ASR engine is often used to process the input speech to determine what the user has said. An electronic device may include an embedded ASR that performs speech recognition locally on the device. The Applicants have recognized that some advantages of performing local speech recognition include that delays need not be incurred in transferring audio to another device to be processed and receiving ASR results and that the audio signal can be processed locally and not be degraded by transmission to a remote device. However, due to some electronic devices' limitations regarding processing power and/or memory storage, ASR of user utterances often is performed remotely from the device (e.g., by one or more networked servers). The larger memory and/or processing resources often associated with server ASR implementations may facilitate speech recognition by providing a larger dictionary of words that may be recognized and/or by using more complex speech recognition models than can be done on the local device. The Applicants have appreciated that these benefits may be offset by the fact that the audio and the ASR results must be transmitted (e.g., over a network) which may cause speech recognition delays at the device and/or degrade the quality of the audio signal.

Some embodiments of the invention are directed to combining the speech recognition capabilities of an embedded ASR system and a remote (e.g., server) ASR system to perform speech recognition by focusing on the strengths provided by each type of system. Such a hybrid speech recognition system may provide accurate results in a more timely manner than either an embedded or server ASR system when used independently.

Figure 1:
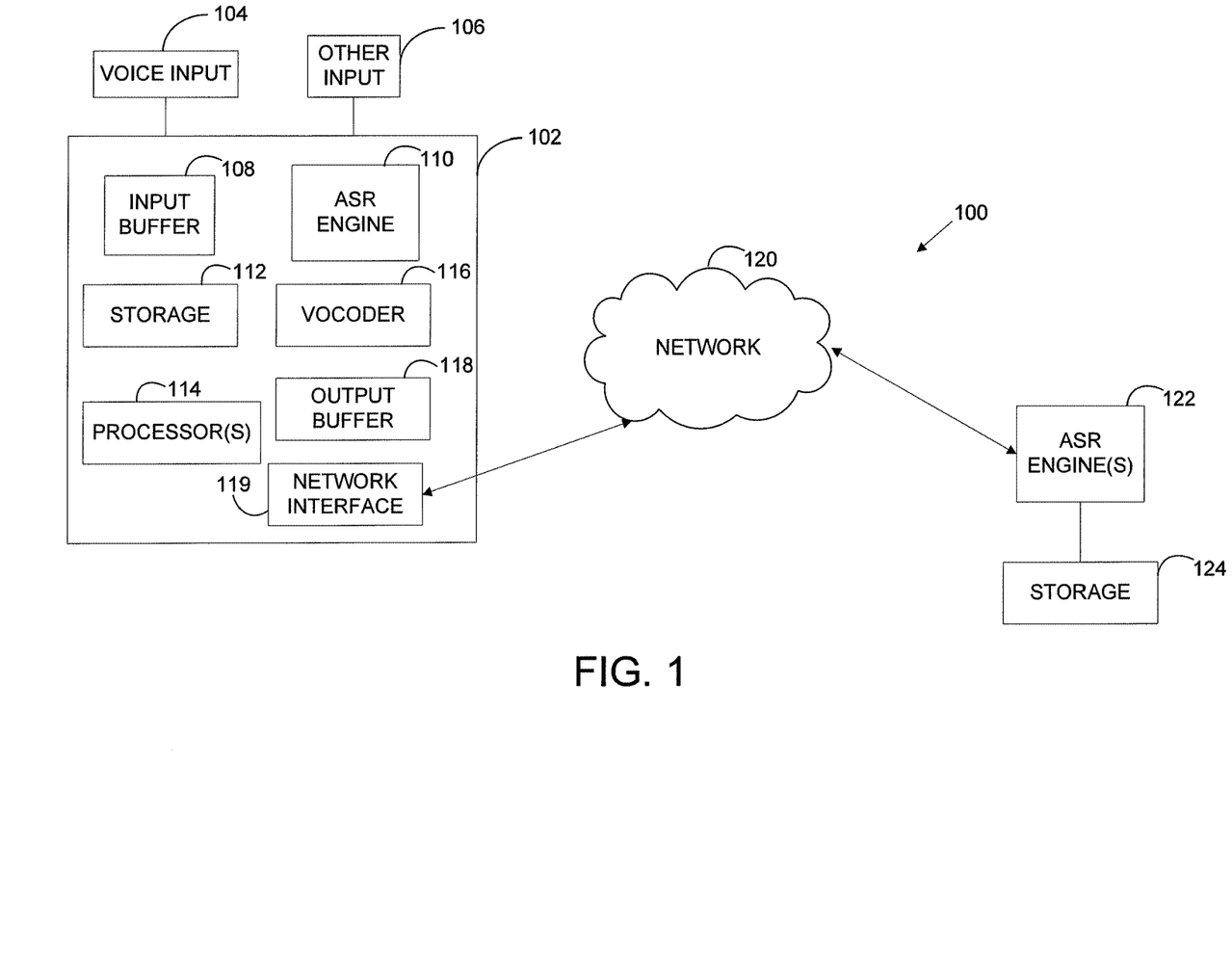
FIG. 1 is a block diagram of a client/server architecture in accordance with some embodiments of the invention.

An exemplary hybrid speech recognition (SR) system 100 in accordance with some embodiments of the invention is illustrated in FIG. 1. Hybrid SR system 100 includes an electronic device 102 that is configured to receive speech via voice input interface 104. Electronic device 102 may be any speech-enabled electronic device, examples of which include a cellular phone, smart phone, personal digital assistant (PDA), laptop computer, tablet computer, or handset device. This list is not exhaustive, as the aspects of the invention described herein can be used with any type of electronic device. An exemplary voice input interface 104 may be a microphone, e.g., manufactured as part of electronic device 102 or externally connected to an input jack of electronic device 102. Electronic device 102 may also include one or more other user interface inputs 106 that enable a user to interact with electronic device 102. For example, other inputs 106 may include, but are not limited to, a keyboard, a touch screen, and one or more buttons or switches connected to electronic device 102. Input speech received via voice input interface 104 may be encoded and stored in input buffer 108. For example, incoming audio may be encoded using Pulse Code Modulation (PCM), which digitally represents the sampled input audio signal. However, it should be appreciated that incoming audio may be encoded and stored in any other suitable format, as the aspects of the invention described herein are not limited in this respect.

Electronic device 102 may include embedded ASR engine 110 configured to perform speech recognition on audio stored in input buffer 108. Embedded ASR engine 110 may be configured to perform speech recognition on the audio stored in input buffer 108 using one or more acoustic models, language models and/or speech recognition techniques, as aspects of the invention are not limited in any way by the specific implementation of the embedded ASR engine. Electronic device 102 may include one or more storage devices 112 configured to store one or more dictionaries or vocabularies that embedded ASR engine may access to facilitate speech recognition. For example, in some embodiments, storage 112 may include a phoneme dictionary that stores phoneme to grapheme conversion information to enable embedded ASR engine 110 to map stored audio to a textual representation. In some embodiments, storage 112 may store a plurality of voice commands that electronic device 102 is configured to recognize such as "call," "text," etc. and the embedded ASR engine 110 may access the stored voice commands as part of a speech recognition process. Storage 112 may also include personal information associated with one or more users of electronic device 102. For example, storage 112 may include a contact list, recent call list, task list, calendar information, or any other information associated with electronic device 102 and/or a user of electronic device 102. In some embodiments, embedded ASR engine 110 may be configured to access at least some of the stored personal information to facilitate speech recognition. For example, the entries in a contact list on a cell phone may be used by embedded ASR engine 110 to restrict the possible recognition results following the commands "call," "dial," or "text."

Additionally, electronic device 102 may include one or more processors 114 configured to execute a plurality of computer-readable instructions stored, for example, in storage 112. For example, electronic device 102 may be a smartphone configured to display a user interface and includes one or more processors 114 that may execute computer-readable instructions that, when executed, present a user interface and determine how to interpret user interactions with the user interface. It should be appreciated that processor(s) 114 may perform any other suitable processing functions including, but not limited to, determining when to send audio to a remote ASR engine and combining speech recognition results from embedded ASR engine 110 and a remote ASR, as described in more detail below.

Exemplary hybrid SR system 100 also includes one or more remote ASR engines 122 connected to electronic device 102 via any suitable communication medium, which is shown in FIG. 1 as a network 120 (which may be a wireless and/or wired network), that is not limited in this respect. Remote ASR engine(s) 122 may be configured to perform speech recognition on audio received from one or more electronic devices such as electronic device 102 and to return the ASR results to the corresponding electronic device. In some embodiments, audio transmitted from electronic device 102 to remote ASR engine(s) 122 may be compressed prior to transmission to ensure that the audio data fits in the data channel bandwidth of network 120. In addition to storing encoded input audio (e.g., encoded using PCM) in input buffer 108, some embodiments also store audio compressed (e.g., by vocoder 116) in output buffer 118. Vocoder 116 may be a compression codec that is optimized for speech or take any other form. For example, the compressed audio in output buffer 118 may be the output of a digital signal processing (DSP) component of electronic device 102 that is used to compress audio data for sending voice calls over a voice channel of a mobile telephone network. In some electronic devices 102, access to hardware compression of audio from the DSP may not be made available to application providers or vendors that provide the ASR capability for the electronic device. In some embodiments that may be used with such electronic devices, the encoded audio stored in input buffer 108 may be used in combination with one or more software encoding methods (e.g., executing on processor(s) 114) to provide compressed audio that may be transmitted to remote ASR engine(s) for speech recognition processing. Any other suitable compression process may be also be used and embodiments of the invention are not limited by any particular compression method.

Electronic device 102 may also include network interface 119 configured to establish a network connection with remote ASR engine(s) 122 over network 120. For example, network interface 119 may be configured to open a network socket in response to receiving an instruction to establish a network connection with remote ASR engine(s) 122. As illustrated in FIG. 1, remote ASR engine(s) 122 may be connected to one or more remote storage devices 124 that may be accessed by remote ASR engine(s) 122 to facilitate speech recognition of the audio data received from electronic device 102. In some embodiments, remote storage device(s) 124 may be configured to store larger speech recognition vocabularies and/or more complex speech recognition models that those employed by embedded ASR engine 110, although the particular information stored by remote storage device(s) 124 does not limit embodiments of the invention. Although not illustrated in FIG. 1, remote ASR engine(s) 122 may include other components that facilitate recognition of received audio including, but not limited to, a vocoder for decompressing the received audio and/or compressing the ASR results transmitted back to electronic device 102. Additionally, in some embodiments remote ASR engine(s) 122 may include one or more acoustic or language models trained to recognize audio data received from a particular type of codec, so that the ASR engine(s) may be particularly tuned to receive audio processed by those codecs.

Rather than relying on either the embedded ASR or the remote ASR to provide the entire speech recognition result for an audio input (e.g., an utterance), some embodiments of the invention use both the embedded ASR and the remote ASR to process portions or all of the same input audio, either simultaneously or with the ASR engine(s) 122 lagging due to the transmission time. The results of multiple recognizers may then be combined to facilitate speech recognition and/or to effectuate a collective action corresponding to the recognized input speech. To this end, some embodiments are directed to processing audio received by an electronic device at least partially in parallel by multiple recognizers and consolidating the recognition results into one or more unified actions that application(s) executing on the electronic device should take in response to the received audio.

In the illustrative configuration shown in FIG. 1, a single electronic device 102 and ASR engine 122 is shown. However it should be appreciated that in some embodiments, a larger network is contemplated that may include multiple (e.g., hundreds or thousands or more) or electronic devices serviced by any number of ASR engines. As one illustrative example, the aspects of the present invention described herein may be used to provide and ASR capability to a mobile telephone service provider thus the techniques described herein can be used to provide ASR capabilities to an entire customer base for a mobile telephone service provider or any portion thereof.

Figure 2:
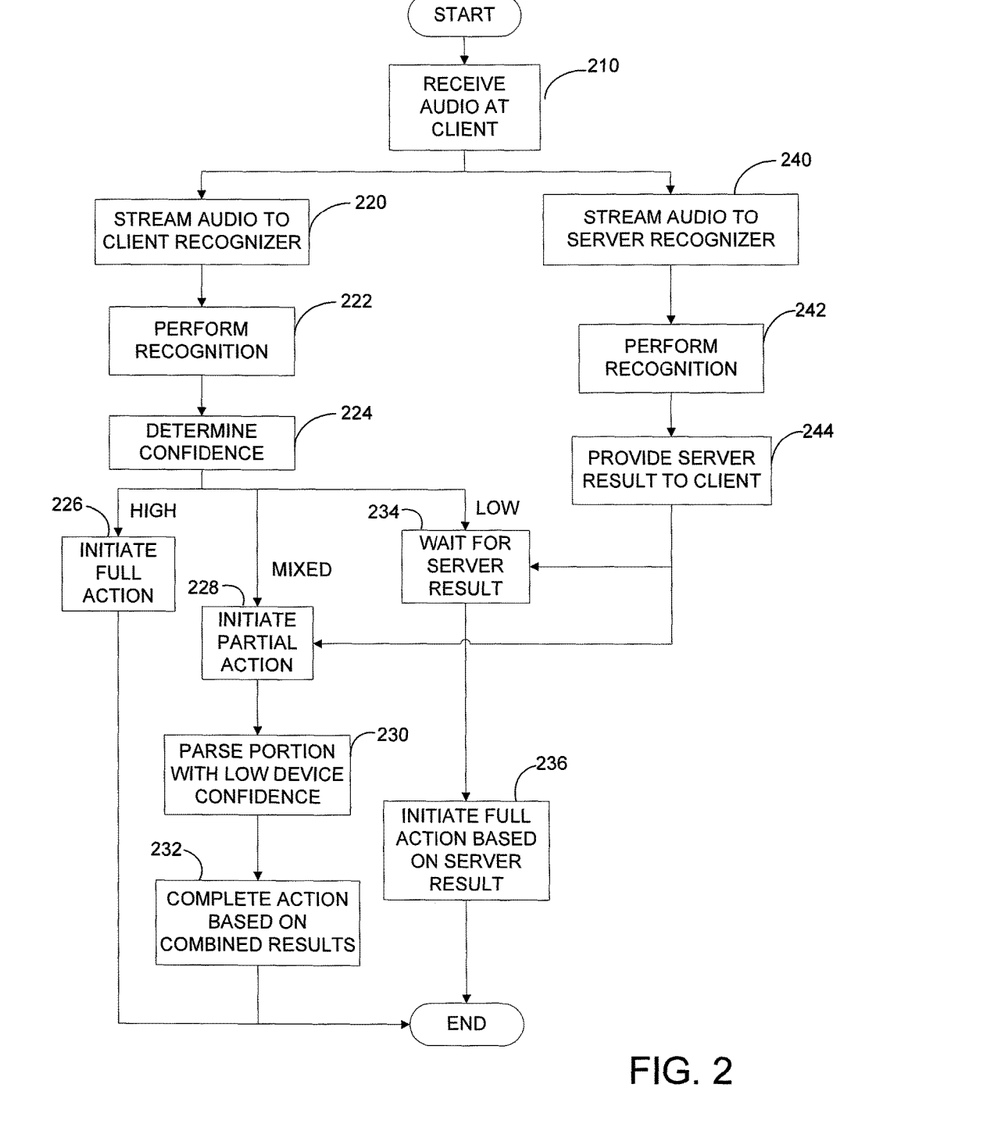
FIG. 2 is a flow chart of a method for recognizing speech received by a client device using multiple recognizers in accordance with some embodiments of the invention.

FIG. 2 provides an exemplary process for processing of input audio using a hybrid client/server SR architecture as described above in connection with the system of FIG. 1, where the client ASR is provided by the embedded ASR engine 110 and the server ASR is provided by the remote ASR engine(s) 122. In act 210, audio is received by a client device such as electronic device 102. Audio received by the client device may be split into two processing streams that are recognized by respective local and remote ASR engines as described previously. For example, after receiving audio at the client device, the process proceeds to act 220 where the audio is streamed to an embedded recognizer on the client device and in act 222, the embedded recognizer performs speech recognition on the audio. In some embodiments, as audio data is being received and encoded in an input buffer, an embedded recognizer may begin a recognition process of the encoded audio prior to detecting the end of the input speech. However, in other embodiments, input speech may be encoded and stored in an input buffer until the end of speech is detected and in response to detecting the end of speech, the embedded recognizer may begin performing speech recognition on the encoded audio.

After the embedded recognizer performs at least some speech recognition of the received audio, the process proceeds to act 224 where a confidence level associated with the recognition results is determined in any suitable manner. In some embodiments, confidence levels or values may be categorized into high, mixed, and low categories, although it should be appreciated that any other suitable number of categories may also be used. Additionally, the threshold values that are used to define different confidence level categories may depend on particular implementations of the embedded ASR, and embodiments of the invention are not limited in this respect. Furthermore, in some embodiments, the threshold values used to define different confidence categories may change if the speech recognition capabilities of the different recognizers change (e.g., improve) over time.

If it is determined in act 224 that the speech recognition results of the embedded processor are associated with a high confidence value, the process proceeds to act 226 where a full action based on the speech recognition results is performed. For example, if the embedded ASR engine determines that the user said "Call Mike" with a high level of confidence, the recognized command "call" may invoke the action of opening an application for making a phone call. Additionally, it may be determined whether a phone number for the recognized name "Mike" exists in a contact list stored on the client device. If such a phone number is found, the phone call application may dial the phone number associated with Mike to initiate the phone call. In some instances, the user may not have provided enough information to initiate a full action. For example, an entry for "Mike" in the contact list of an electronic device may include multiple phone numbers for "Mike" and the input speech "Call Mike" may not be sufficient to determine which of the phone numbers to call. If more input is required from a user, the user may be prompted to provide the additional information to complete the action. For example, the user may be prompted with "Home or Cell?" to distinguish between a home phone number and a cell phone number associated with "Mike."

In some embodiments, if it is determined in act 224 that a confidence value associated with the embedded speech recognition results is high, a network connection to a server recognizer (if one has been established based upon criteria discussed below) may be terminated because the server recognizer results may not be required to perform the action. However, in other embodiments, the network connection to the server recognizer (if established) may not be terminated in response to determining that a high confidence value is associated with an embedded speech recognition result. Rather, the recognition results from the server recognizer may be used to verify that the result determined by the embedded recognizer was correct. In some embodiments, in the event that it is determined that the embedded recognizer was not correct, one or more thresholds associated with the confidence categories may be updated to reduce the likelihood that future actions will be invoked based on input speech misrecognized by the embedded recognizer, although all aspects of the invention are not limited in this respect.

If it is determined in act 224 that the confidence value associated with the embedded ASR results is mixed (i.e., there is high confidence in recognition of part but not all of an audio input), the process proceeds to act 228 where a partial action is performed based on the embedded ASR results. For example, if the user utterance is "Text Mom I'll be home at eight," it may be determined with a high confidence that the command "Text" and the recipient "Mom" were properly recognized by the embedded ASR engine, but that the remaining information to include in the body of the text message may be associated with a low confidence value. In this example, the electronic device may perform a partial action by opening a text messaging application and filling in the recipient field with information associated with "Mom" as stored by a contact list in the electronic device. However, the message body for the text message may be left blank pending the receipt of the speech recognition results from the server recognizer.

After receiving the server recognition results at the electronic device, the process proceeds to act 230, where the electronic device parses the portion of the input speech from the server recognition results that was determined to have a low confidence value. Parsing may be performed in any suitable way. For example, an application executing on the client device may use word timings, word alignment, or pronunciation alignment of the embedded ASR result and the server result to determine which portion of the results received from the server correspond to the portion associated with low confidence from the embedded ASR.

Continuing with the example above, the low confidence part corresponds to the portion of the audio following "Mom." After determining the part of the server recognition results that corresponds to the low confidence portion of the embedded recognition results, the process proceeds to act 232, where the partial action initiated in act 228 is completed based, at least in part, on the speech recognition results of the server recognizer. For example, the server recognizer may have determined that the low confidence part of the input speech corresponds to "I'll be home at 8." Accordingly, text corresponding to this recognized portion of the input speech may be entered into the message body of the text message opened by a text messaging application in act 228. In some embodiments, one or more applications executing on the client device may be configured to manage the results of the embedded ASR engine and communicate with corresponding one or more applications executing on the server. By initiating partial actions, a user may be able to quickly determine whether the initial recognition by the embedded ASR engine was correct by observing the results of the partial action performed in response to a mixed confidence determination (e.g., opening a text application and populating the field with "Mom"). Thus, if the system erred in its determination of the intended action, the user can immediately abort in any suitable way and retry, rather than awaiting the full results from the ASR server.

In some embodiments, the system may be configured to cope with delays in the availability of server results due to network or other processing latency. One configuration would incorporate a timeout such that the client would skip to initiating a full action 226 if delays in 242 or 244 exceed the specified timeout.

In some embodiments, the server recognition results may be used to train the embedded recognizer to improve the recognition performance of the embedded recognizer. Training of the embedded recognizer based on the server recognizer results may be performed in any suitable manner. In some embodiments, the client device and/or the server may store one or more statistics detailing the usage of pronunciations or grammatical forms spoken by a user of the client device. For example, a user may frequently say the phrase "find coffee near me." In this example, the embedded ASR may return mixed confidence results with the command name "find" being recognized with high confidence by the embedded ASR, while the content "coffee near me" has low confidence and is subsequently recognized by the server ASR. For some frequently occurring input speech, a grammar associated with the embedded recognizer may be updated to include the server result so that the embedded ASR is trained and able to recognize with high confidence the entire input speech, thereby enabling the client device to quickly initiate a full action without having to rely on receiving results from the server.

If it is determined in act 224 that the confidence value associated with the embedded recognition result is low, the process proceeds to act 234, where the electronic device waits to receive the result from the server recognizer. When the server result is received from the server recognizer, the process proceeds to act 236, where a full action is initiated based on the server result or a combination of the embedded recognizer result and the server result. In some embodiments, the server result may be trusted over the embedded recognizer result, which may be discarded when it is determined in act 224 that the confidence value associated with the embedded recognizer result is low. Accordingly, the full action initiated in act 236 may be based entirely on the result returned from the server recognizer. However, in other embodiments, even though the embedded recognizer result was associated with a low confidence value, at least a portion of the embedded recognizer result may be trusted more than the server result. For example, as noted above, in some embodiments the embedded recognizer may have access to personal information such as a contact list stored on the electronic device that the server recognizer may not have access to. Thus, an embedded recognition result for a name of a contact in the contact list may be trusted more than the server result for the contact name despite the fact that a low confidence value was associated with the embedded recognition result. Aspects of the invention are not limited in this respect, as the embedded and server ASR results may be combined in any suitable manner.

As described above, when audio is received by the client device in act 210, the audio may be streamed to both the client recognizer in act 220 and the server recognizer in act 240. In some embodiments, opening of a network connection to the server may be initiated when audio is received and in act 240, the audio may be streamed to the server recognizer as soon as the network connection is opened between the client device and the server recognizer. For example, the incoming audio may be compressed and stored in an output buffer and as soon as a network connection is established between the client device and the server recognizer, the compressed audio may be read out of the output buffer and may be transmitted to the server recognizer for recognition. In other embodiments discussed below, compressed audio may be transmitted to the server recognizer only after the client device detects the end of the input speech or some other event occurs. In such embodiments, the client device may compress the audio and store the compressed audio in an output buffer until the particular event occurs.

After the audio is streamed to the server recognizer, the process proceeds to act 242 where the server recognizer performs speech recognition of the received audio. In some embodiments, the server recognizer will perform speech recognition on the entire received audio. However, aspects of the invention are not limited in this respect. In other embodiments, the client device may also send to the server confidence levels from the embedded ASR, and the server recognizer may only perform recognition on parts of the received audio that the embedded recognizer has associated with a low confidence value. The process then proceeds to act 244 where the server result is provided to the client device over the network. As described earlier, in some embodiments, when it is determined in act 224 that the embedded recognizer result is associated with a mixed or low confidence value, the server result returned to the client device may be used in whole or in part to complete or initiate an action in response to the recognized input speech.

The Applicants have recognized and appreciated that streaming audio to a server over a network costs network bandwidth (e.g., over a voice channel and/or a data channel) and it may be preferable in some implementations to delay streaming of the audio to the server until it is determined that the recognition by the server ASR will be needed. Accordingly, in some embodiments, audio may be streamed to the server recognizer at a delay compared to when the embedded recognizer processes the input audio. In some embodiments, a determination that server recognition is required may be based, at least in part, on a determination that the confidence value associated with results of the embedded ASR is below a predetermined threshold value.

In some embodiments, the determination of when to stream audio to a server recognizer may be based, at least in part, on one or more policies specified by an administrator of the communications network over which the audio is being streamed. For example, a mobile telephone network provider may define a policy that balances the tradeoff between latency for receiving speech recognition results from the server and the consumption of network bandwidth in transmitting audio to the server and receiving results. If the policy indicates a willingness to accept some increased latency to save bandwidth, in some embodiments audio may be streamed to a server over the mobile telephone network only after it is determined that the embedded recognizer in the mobile telephone cannot recognize the input speech with sufficient accuracy. A different mobile telephone network provider may define a different policy that specifies that reduced latency is more important than reducing the usage of network bandwidth. When implemented with embodiments of the invention, this policy may cause audio associated with the input speech to be streamed to both the embedded recognizer and the server recognizer prior to a determination of the confidence value associated with the embedded recognizer results (e.g., as soon as possible after the audio is received and perhaps even before the full input is received). Any policy between the two extremes also is possible. In this way, hybrid client/server architectures in accordance with embodiments of the invention enable network providers more flexibility to tailor network usage based on providers' preferences than can be achieved in client-only or server-only ASR solutions.

In some embodiments, the results of the embedded recognizer may be transmitted to the server recognizer in addition to streaming the audio data as discussed above. In some embodiments, the embedded ASR results may be used to constrain one or more aspects of the speech recognition process performed by the server ASR.

The server ASR may perform speech recognition using different grammars tailored for recognizing different types of user utterances and the embedded ASR results may be used by the server ASR to select an appropriate grammar. For example, the server ASR may use a web search grammar for recognizing speech associated with web searches and a messaging grammar for recognizing speech associated with text messages. Since the embedded ASR may have a high proficiency in recognizing commands (e.g., "Text," "Search," "Call," etc.), in some embodiments, the server recognizer may trust the command portion of the embedded ASR results to select a grammar to facilitate recognition of the encoded audio.

In some embodiments, some information stored on the client device (e.g., contact list) may be transmitted to the server so that it can be used to facilitate ASR operations on the server. However, in other embodiments, certain information stored on client devices may not be transmitted to a server recognizer due to privacy concerns. For example, some users may not want their full contact list to be sent across a network and stored by a server. Although a full contact list (or other personal information stored on the client device) may not be transmitted to the server, in some embodiments, the embedded ASR results transmitted to the server recognizer may be used to add new vocabulary, such as a list of top names recognized by the client device, to a grammar to facilitate speech recognition by the server ASR.

Figure 3:
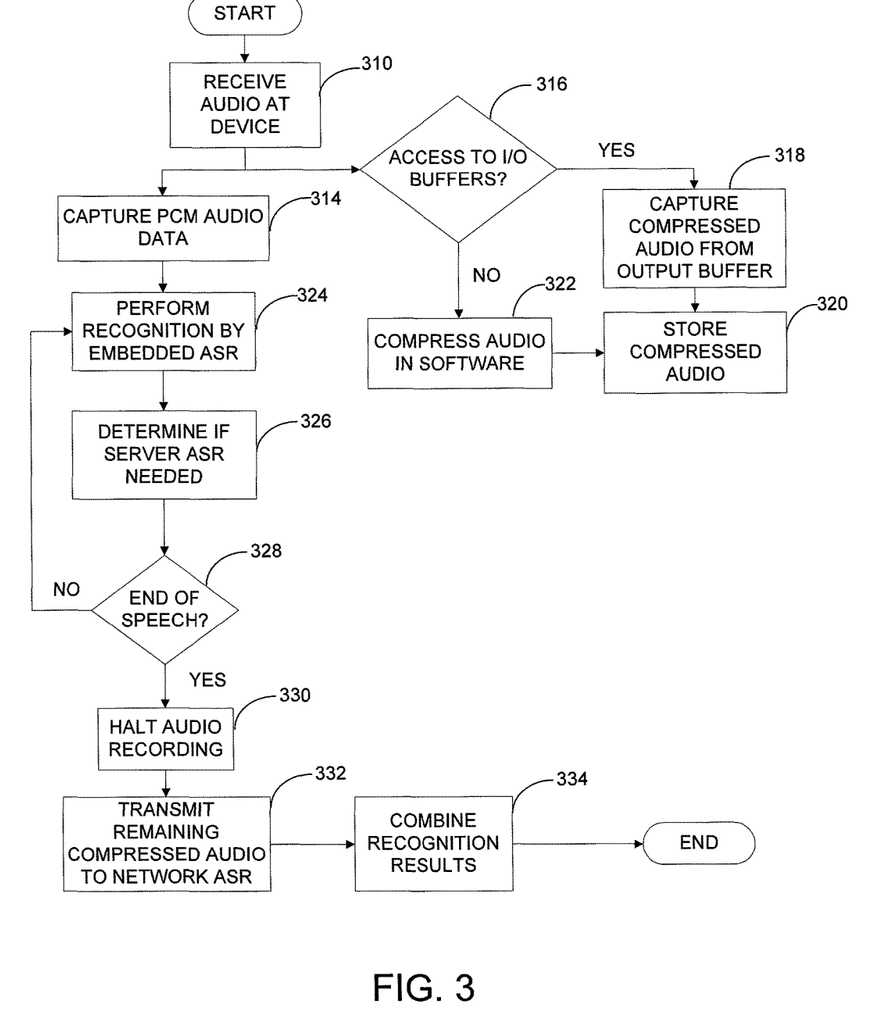
FIG. 3 is a flow chart of a method for routing speech to different recognizers in accordance with some embodiments of the invention.

As described above, some embodiments are directed to conserving network resources by opening a network connection between a client device and a server recognizer only when it is determined that recognition by the server ASR is required. An exemplary process for managing a network connection between a client device and a server recognizer is illustrated in FIG. 3. In act 310, audio corresponding to input speech is received by the client device. The process then proceeds to act 314 where the input audio is encoded (e.g., as PCM data) and stored in an input buffer to enable an embedded ASR engine to perform speech recognition on the encoded audio.

In some embodiments, an interface between the embedded ASR and the native audio system of the client device supports capturing both encoded audio data (e.g., PCM audio data) in act 314 for use by the embedded ASR engine and compressed audio data from a DSP in the client device for transmission over a network connection to the server. However, some client devices do not support access to both the input buffer of a DSP where the encoded audio data may be stored and the output buffer of the DSP where the compressed audio data may be stored. Capturing both the encoded audio and the compressed audio eliminates the need to compress the audio in software, thereby helping to minimize the delay in transmitting the compressed audio data to the server recognizer over the network. Additionally, capturing both audio buffers from the DSP reduces the load on the one or more processors of the client device, which may enable the client device to use higher accuracy recognition models for the same processor load. However, it should be appreciated that not all embodiments are directed to capturing different types of audio for use by the embedded and server ASRs.

In some embodiments, after audio is received by the client device in act 312, the process also proceeds to act 316 where it is determined whether the native audio system of the client device has access to both the input and output buffers of a DSP included in the device. For example, the input buffer may be the input buffer in which the input audio is encoded and stored in act 314. The client device may include a DSP with a vocoder configured to compress the input audio for transmission over a network connection and the compressed audio may be stored in an output buffer of the DSP. If it is determined in act 316 that the native audio system of the client device has access to the input and output buffers of the DSP, the process proceeds to act 318 where the audio compressed by the DSP is captured and in act 320 the captured compressed audio is stored in an output buffer for later transmission over a network to the server. If it is determined in act 316 that the client device does not support access to both the audio input and output buffers of the DSP, the process proceeds to act 322 where the audio is compressed using software (e.g., software provided specifically to support the hybrid ASR techniques described herein) to provide the vocoded data. After software compression, the process proceeds to act 320 where the compressed data is stored in an output buffer for later transmission over a network. In some embodiments, in act 320 the compressed audio is stored in first-in first-out (FIFO) storage, while the captured encoded audio data is provided to the embedded ASR engine to begin recognition. By buffering the compressed audio in a FIFO (or other storage), audio data that may be transmitted to the server ASR may be prepared prior to knowing if transmission to the server will be needed, thereby reducing the latencies associated with transmitting the data to the server once the network connection is established.

Some embodiments are directed to enabling a network provider to balance a tradeoff between minimizing network latency and reducing usage of network resources by defining a policy that configures the operation of opening and closing a network connection in a client/server architecture. Delays in establishing a network connection may result from several factors. For example, the network may not always be active at all times and/or at all locations, causing a delay in accessing the network. If the client device is a cell phone or smartphone that communicates over a mobile telephone network, the process of establishing a network connection may involve one or more messages transmitted between a network interface of the client device and a cell tower to negotiate the establishment of a data channel to transmit the compressed audio. On slower networks, this negotiation may take between five and ten seconds to complete before a network connection can be established. In some embodiments, compressed audio is stored in an output buffer on the client device and the compressed audio is transmitted to a server ASR engine as soon as a network connection is established.

Referring back to the process illustrated in FIG. 3, while the embedded ASR of a client device performs speech recognition in act 324, process control proceeds to act 326 where it is determined whether recognition by the server ASR will be employed. In some embodiments, the determination of whether server recognition will be employed may be based, at least in part, on a policy defined by a network provider related to balancing recognition latency with network bandwidth usage, as described in more detail with regard to FIG. 4.

Figure 4:
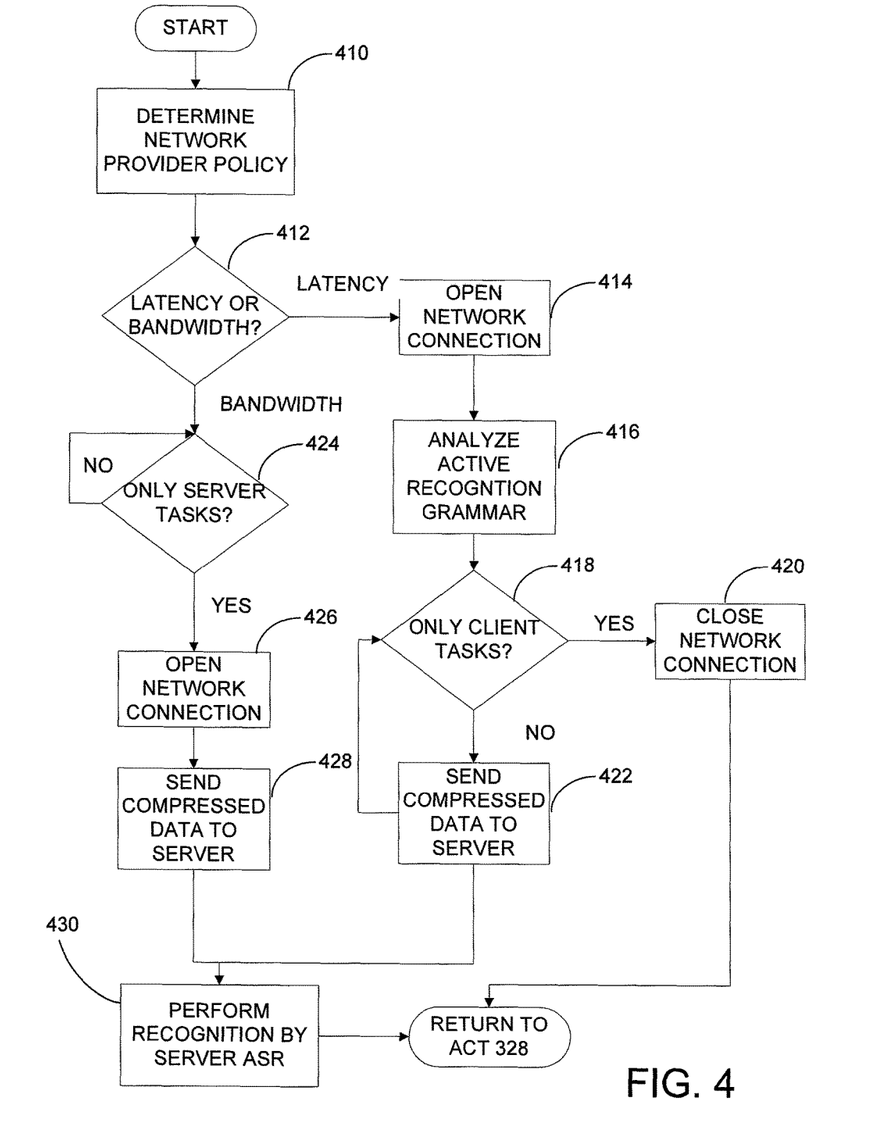
FIG. 4 is a flow chart of a method for managing a network connection based on a network provider policy in accordance with some embodiments of the invention.

In act 410, a network provider policy is determined. One or more preferences for establishing a network connection in accordance with the network provider policy may be stored on the client device and these preferences may be consulted to determine whether the policy related to minimizing recognition result latency, minimizing the use of network resources (e.g., bandwidth), or some combination of balancing latency and bandwidth. After retrieving information about the network provider policy, process control continues to act 412 where it is determined whether the policy specifies minimizing latency or network bandwidth. Although act 412 is shown as being a binary choice between latency and bandwidth minimization policies, it should be appreciated that some policies that may be used in accordance with embodiments of the invention may not be exclusively devoted to minimizing latency or bandwidth. Rather, some policies may try to balance both latency and bandwidth (or some other aspect of the network connection) by using a different combination of rules not explicitly described herein. It should be appreciated that such types of policies may also be used with some embodiments of the invention and embodiments are not limited in the particular policies that may be specified or by whom (e.g., by a network provider).

If it is determined in act 412 that the policy focuses on reducing overall recognition latency, the process proceeds to act 414, where a network connection is opened as soon as possible to enable the client device to transmit compressed audio data to a server ASR engine over the network. For example, some client devices may include a button for enabling a speech input device such as a microphone to receive speech input. In some embodiments, a network connection may be opened in response to the user activating the button enabling speech input. In other embodiments, a network connection may be opened in response to detecting the start of input speech by a user, or in any other suitable way.

In some embodiments, even though the policy (e.g., specified by the network provider) may focus on minimizing latency, the Applicants have recognized and appreciated that the use of network resources may still be minimized in such a configuration by evaluating the types of tasks associated with an active recognition grammar being used by the embedded ASR.

The Applicants have recognized that some speech recognition tasks may be adequately handled by an embedded ASR engine of a client device, whereas other speech recognition tasks may benefit more from using a server ASR engine. For example, in some embodiments, the embedded ASR may be able to recognize speech associated with command and control tasks and voice-activated dialing (VAD) tasks, while the server ASR may be required or preferred for other types of tasks such as dictation tasks or the content of a search query, text, etc. It should be appreciated that this breakdown of tasks for client versus server ASR is merely exemplary and the particular set of tasks that may be appropriately handled by an embedded ASR and a server ASR may depend on the capabilities of the ASRs in a specific implementation.

Figure 5:
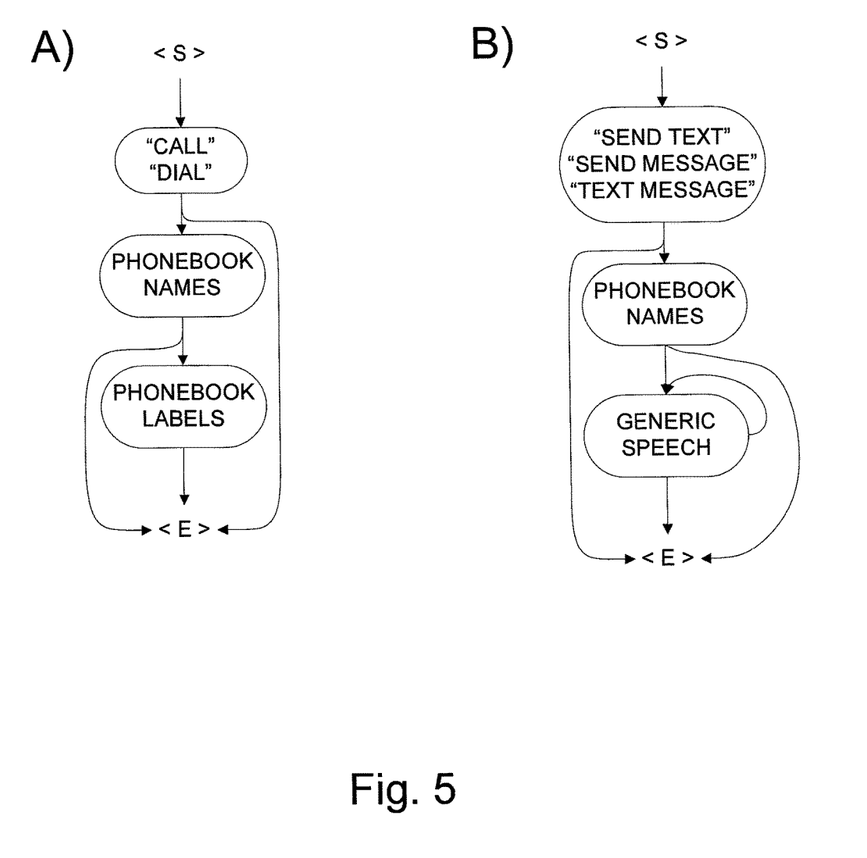
FIGS. 5A and 5B are exemplary grammars that may be activated by an embedded ASR engine in accordance with some embodiments of the invention.

Continuing with the exemplary process of FIG. 4, after a network connection has been opened, the process proceeds to act 416 where one or more active recognition grammars of the embedded ASR engine are analyzed. FIG. 5 illustrates two illustrative grammars that may be activated by the embedded ASR engine in response to input speech received by a client device. FIG. 5A illustrates a exemplary phone call grammar that has been activated in response to recognizing the command "Call" or "Dial." Once the phone call grammar is activated, a search tree associated with the remaining types of items in the grammar to be recognized may be considered to determine whether the server ASR will be necessary to complete the action associated with the input speech. That is, the process of FIG. 4 proceeds to act 418 where it is determined whether the active grammar(s) include only tasks that the embedded ASR can handle. In the exemplary phone call grammar shown in FIG. 5A, all of the remaining types of information (e.g., phonebook names, phonebook labels) are restricted to items that the embedded ASR engine may be configured to recognize. Thus, regardless of whether the user says "Call," "Call Mike," or "Call Mike cell" the remaining items in the grammar may all be recognized by the embedded ASR engine without the use of the server ASR engine. Accordingly, it may be determined in act 418 that the grammar(s) include only client tasks and the process proceeds to act 420 where the network connection is closed. By closing the network connection as soon as it is determined that the embedded ASR engine can recognize the remaining items in the input speech, over-the-air bandwidth of the network operator may be conserved and the server ASR may be freed to handle requests for speech recognition from other client devices as soon as possible.

If it is determined in act 418 that the active recognition grammar does not include only client tasks, the process proceeds to act 422 where compressed audio data is sent to the server recognizer from an output buffer (e.g., a FIFO) of the client device. The process then proceeds to act 430 where the server ASR engine begins speech recognition of the compressed audio data. An example grammar that includes at least some items that may not be associated with client tasks is shown in FIG. 5B. The exemplary messaging grammar shown in FIG. 5B includes both an item (phonebook names) that corresponds to a recipient of the text message and may be recognized by the embedded ASR engine and another item (generic speech) that corresponds to text in a message body of the text message and may be best recognized by a server ASR engine (e.g., may be incapable of recognition by the client). A generic speech node in an active grammar may signify that the input speech may contain dictation (e.g., for text in a message body) that the embedded ASR engine may have a difficult time recognizing or be unable to recognize. Accordingly, in some embodiments, when determining in act 418 if there are only client tasks in an active recognition grammar of the embedded ASR engine, a determination may be made if at least one generic speech node exists in the active grammar, and if so, it may be determined that server tasks in addition to client tasks remain active in the grammar search tree.

If it is determined in act 412 that the network provider policy is focused primarily on reducing bandwidth, the process proceeds to act 424 where it is determined whether all search paths through the active recognition grammar(s) include at least one node a server task and the hybrid client/server system may be configured to delay establishing a network connection until it is known that the server ASR will be required. For example, consider the messaging grammar illustrated in FIG. 5B. The embedded ASR engine may recognize the command "Send text" and the messaging grammar of FIG. 5B (and possibly other grammars) may be activated. However, at this point search paths through the grammar still exist that do not include nodes corresponding to server tasks. For example, the paths that bypass the "generic speech" node do not include tasks that should be performed by the server ASR. Accordingly, if the determined network provider policy indicates that bandwidth is to be reduced, it may be determined in act 424 that search paths still exist that do not include a server task node and opening a network connection may be delayed. However, after the embedded ASR recognizes "Send text Mike," all remaining paths in the search tree include the generic speech node corresponding to the message body of the text message (e.g., the generic speech node). At this point it may be determined in act 424 that the server ASR will be required and process control proceeds to act 426 where a network connection is opened. Once the network connection is opened, process control proceeds to act 428 where compressed audio data is sent to the server ASR engine. Process control then proceeds to act 430 where the server ASR engine begins performing speech recognition on the compressed audio.

In some embodiments, the embedded ASR engine of a client device may be configured to determine the end of the speech input. After the network connection is closed in act 420 or the server ASR begins speech recognition in act 430, process control returns to act 328 of the process illustrated in FIG. 3 where it is determined if the end of speech has been detected. If it is determined in act 328 that the end of speech has not been detected, process control returns to act 324 where recognition of the input speech by the embedded ASR (and the server ASR, if applicable) continues. However, if it is determined in act 328 that the end of speech has been detected, process control proceeds to act 330 where encoding of input audio by the client device is halted. Halting the encoding of input audio may avoid sending unnecessary audio data that includes only silence over the network.

Process control then proceeds to act 332 where any remaining compressed audio data in the output buffer of the client device is sent to the server ASR engine to enable the server ASR to complete speech recognition of the input speech. Once speech recognition is completed by the server ASR engine, the results are sent back to the client device over the network and process control proceeds to act 334 where the embedded ASR results and the server ASR results are combined.

The results from multiple recognizers may be combined in any suitable way including, but not limited to, the methods described above for combining speech recognition results based on confidence scores or types of tasks for which particular recognizers are proficient. For example, if mismatched results are returned by the embedded and server ASR engines, in some embodiments, the combined recognition results may include portions of each of the results returned by the embedded and server ASR engines based, at least in part, on whether the portions are associated with a task that the recognizer is configured to recognize. Additionally, the server ASR may recognize the entire input audio and the server results may be used to verify the embedded ASR results.

As described above, in some embodiments, results from multiple recognizers may be combined using a priori decisions regarding tasks that each recognizer is believed to perform best. For example, an embedded recognizer may accurately recognize commands, names in a contact list, and locations, whereas a server recognizer may be better at recognizing web search parameters and dictation such as text message bodies. This is merely an example, as other divisions of tasks are possible. In some embodiments, this basic logic for combining the results from multiple recognizers may be supplemented by additional logic on the server side and/or the client side that compares the recognition results and allows the embedded ASR result or the server ASR result to be adopted based on confidence values. Thus, in some embodiments, even if the embedded ASR is tuned to recognize commands, the client device may adopt the server results over the embedded ASR results if the server results are of sufficiently high confidence.

In some embodiments, results from multiple recognizers may be combined by taking the full result from either the embedded ASR or the server ASR, although in other embodiments, portions of each of the results from multiple recognizers may combined to produce the final result.

The Applicants have recognized that previous ASR systems often prompt the user for information to complete an action. This may be due, in part, to previous ASR systems' inability to identify multiple types of information in a single user utterance and to send the different parts of the utterance to recognizers proficient in performing particular speech tasks. Accordingly, some embodiments enable a user to speak an entire utterance without directed prompts and to recognized the utterance using a distributed speech recognition system where different parts of the utterance are processed by different recognizers. For example, a user may speak "Text Mike way to go!" and some embodiments of the invention may identify "Text" as a command, "Mike" as a name, and "way to go!" as a message body. Each of these portions of the utterance may then be processed by a recognizer configured to handle the particular type of information. For example, the command and name portions may be processed by an embedded recognizer and the message body portion may be processed by a server recognizer. It should be appreciated, however, that associations between types of information and recognizers may be specified in any particular way and the above-described example is provided merely for illustrative purposes.

Figure 6:
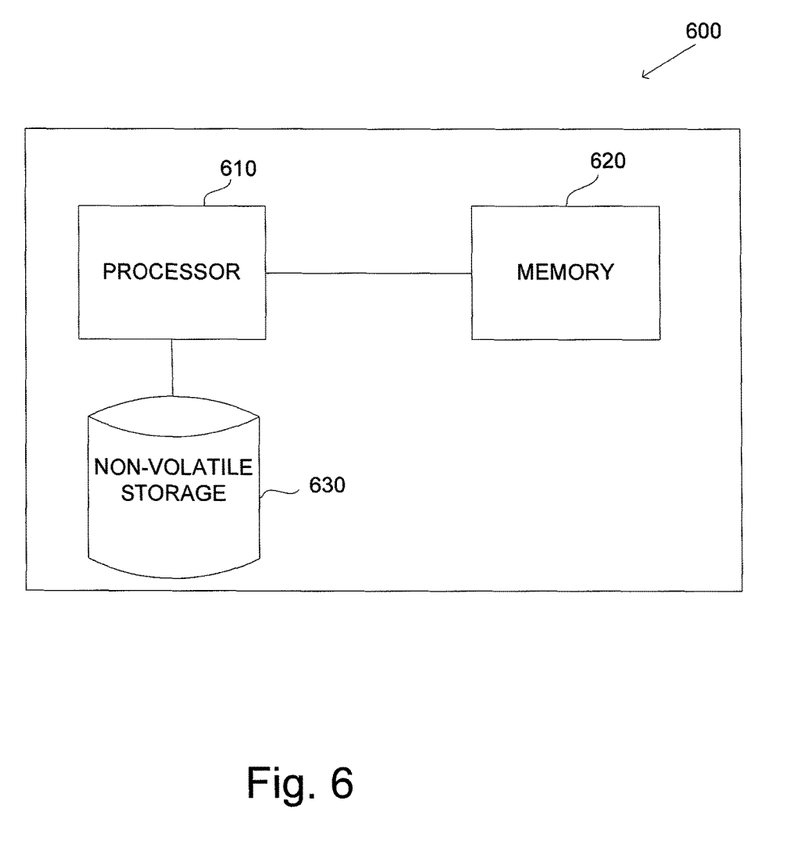
FIG. 6 is an exemplary computer system that may be used in connection with some embodiments of the invention.

An illustrative implementation of a computer system 600 that may be used in connection with any of the embodiments of the invention described herein is shown in FIG. 6. The computer system 600 may include one or more processors 610 and one or more computer-readable non-transitory storage media (e.g., memory 620 and one or more non-volatile storage media 630). The processor 610 may control writing data to and reading data from the memory 620 and the non-volatile storage device 630 in any suitable manner, as the aspects of the present invention described herein are not limited in this respect. To perform any of the functionality described herein, the processor 610 may execute one or more instructions stored in one or more computer-readable storage media (e.g., the memory 620), which may serve as non-transitory computer-readable storage media storing instructions for execution by the processor 610.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of performing speech recognition in a distributed system comprising an electronic device including an embedded speech recognizer and a network device including a remote speech recognizer remote from the electronic device, the method comprising:
    receiving, by the electronic device, input audio comprising speech;
    accessing, prior to sending at least a portion of the input audio to the network device, personal information stored on the electronic device, wherein the personal information is associated with the electronic device and/or a user of the electronic device;
    processing, by the embedded speech recognizer prior to sending at least a portion of the input audio to the network device, at least a portion of the input audio to produce recognized speech and a confidence value for the recognized speech, wherein the processing is based, at least in part, on the accessed personal information stored on the electronic device;

determining based, at least in part, on the confidence value, whether to send at least a portion of the input audio to the network device for speech recognition by the remote speech recognizer, wherein the remote speech recognizer does not have access to the personal information stored on the electronic device; and sending, in response to determining to send at least a portion of the input audio to the network device, the at least a portion of the input audio and at least some of the accessed personal information stored on the electronic device to the network device.

2. The method of claim 1, wherein processing at least a portion of the input audio comprises:
identifying a type of voice command associated with the input audio;
selecting a speech recognition grammar and/or a recognition vocabulary based, at least in part, on the identified type of voice command; and
wherein processing the at least a portion of the input audio comprises processing the at least a portion of the input audio using the selected speech recognition grammar and/or the selected recognition vocabulary.

3. The method of claim 1, further comprising:
selecting a recognition vocabulary based, at least in part, on the personal information; and
wherein processing at least a portion of the input audio comprises processing the at least a portion of the input audio using the selected recognition vocabulary.

4. The method of claim 3, wherein the personal information includes a recent call list stored on the electronic device and wherein the selected recognition vocabulary includes words associated with the recent call list.

5. The method of claim 1, further comprising:
receiving a remote speech recognition result from the network device; and
performing at least one action based, at least in part, on the remote speech recognition result.

6. The method of claim 1, wherein the personal information is selected from the group consisting of a recent call list, a task list, and calendar information.

7. The method of claim 1, further comprising:
determining that the user of the electronic device is requesting to initiate a call; and
wherein processing the at least a portion of the input audio comprises processing at least a portion of the input audio based, at least in part, on a recognition vocabulary associated with entries in a contact list stored on the electronic device.

8. The method of claim 1, further comprising:
determining that the user of the electronic device is requesting to initiate a web-based search;
selecting in response to the determining that the user of the electronic device is requesting to initiate a web-based search, a search grammar; and
wherein processing the at least a portion of the input audio comprises processing the at least a portion of the input audio using the selected search grammar.

9. The method of claim 1, wherein processing the at least a portion of the input audio comprises:
configuring the embedded speech recognizer based, at least in part, on the personal information; and
performing at least one action based, at least in part, on the recognized speech produced by the embedded speech recognizer.

10. The method of claim 9, wherein the at least one action is selected from the group consisting of initiating a call, sending a communication including text, and performing a web-based search.

11. The method of claim 1, further comprising:
sending, in response to determining to send at least a portion of the input audio to the network device, the recognized speech corresponding to the at least a portion of the input audio to the network device.

12. The method of claim 1, wherein the at least some of the accessed personal information stored on the electronic device that is sent to the network device includes information associated with a contact list.

13. A non-transitory computer-readable storage medium encoded with a plurality of instructions that, when executed by at least one processor on an electronic device in a distributed speech recognition system comprising the electronic device having an embedded speech recognizer and a network device having a remote speech recognizer remote from the electronic device, perform a method comprising:
receiving, by the electronic device, input audio comprising speech;
accessing, prior to sending at least a portion of the input audio to the network device, personal information stored on the electronic device, wherein the personal information is associated with the electronic device and/or a user of the electronic device;
processing, by the embedded speech recognizer prior to sending at least a portion of the input audio to the network device, at least a portion of the input audio to produce recognized speech and a confidence value for the recognized speech, wherein the processing is based, at least in part, on the accessed personal information stored on the electronic device;
determining based, at least in part, on the confidence value, whether to send at least a portion of the input audio to the network device for speech recognition by the remote speech recognizer, wherein the remote speech recognizer does not have access to the personal information stored on the electronic device; and
sending, in response to determining to send at least a portion of the input audio to the network device, the at least a portion of the input audio and at least some of the accessed personal information stored on the electronic device to the network device.

14. The computer-readable storage medium of claim 13, wherein processing the at least a portion of the input audio comprises:
identifying a type of voice command associated with the input audio;
selecting a speech recognition grammar and/or a recognition vocabulary based, at least in part, on the identified type of voice command; and
wherein processing the at least a portion of the input audio comprises processing the at least a portion of the input audio using the selected speech recognition grammar and/or the selected recognition vocabulary.

15. The computer-readable storage medium of claim 13, further comprising:
selecting a recognition vocabulary based, at least in part, on the personal information; and
wherein processing the at least a portion of the input audio comprises processing the at least a portion of the input audio using the selected recognition vocabulary.

16. The computer-readable storage medium of claim 13, further comprising:

determining that the user of the electronic device is requesting to initiate a web-based search;
selecting in response to the determining that the user of the electronic device is requesting to initiate a web-based search, a search grammar; and
wherein processing the at least a portion of the input audio comprises processing the at least a portion of the input audio using the selected search grammar.

17. The computer-readable storage medium of claim 13, wherein processing the at least a portion of the input audio comprises:
configuring the embedded speech recognizer based, at least in part, on the personal information; and
performing at least one action based, at least in part, on the recognized speech produced by the embedded speech recognizer.

18. An electronic device for use in a distributed speech recognition system comprising the electronic device and a network device remote from the electronic device, the electronic device, comprising:
at least one storage device configured to store personal information associated with the electronic device and/or a user of the electronic device; and
an embedded speech recognizer configured to:
receive input audio comprising speech;
access, prior to sending at least a portion of the input audio to the network device, personal information stored on the electronic device, wherein the personal information is associated with the electronic device and/or a user of the electronic device;
process, prior to sending at least a portion of the input audio to the network device, at least a portion of the input audio to produce recognized speech and a confidence value for the recognized speech, wherein the processing is based, at least in part, on the accessed personal information stored on the electronic device; and
at least one processor programmed to:
determine based, at least in part, on the confidence value, whether to send at least a portion of the input audio to the network device for speech recognition by the remote speech recognizer, wherein the remote speech recognizer does not have access to the personal information stored on the electronic device; and
send, in response to determining to send at least a portion of the input audio to the network device, the at least a portion of the input audio and at least some of the accessed personal information stored on the electronic device to the network device.

19. The electronic device of claim 18, wherein processing at least a portion of the input audio comprises:
identifying a type of voice command associated with the input audio;
selecting a speech recognition grammar and/or a recognition vocabulary based, at least in part, on the identified type of voice command; and
processing the at least a portion of the input audio using the selected speech recognition grammar and/or the selected recognition vocabulary.

20. The electronic device of claim 18, wherein the at least one processor is further programmed to select a recognition vocabulary based, at least in part, on the personal information; and
wherein processing the at least a portion of the input audio comprises processing the at least a portion of the input audio using the selected recognition vocabulary.

21. The electronic device of claim 18, wherein the at least one processor is further programmed to:
receive a remote speech recognition result from the network device; and
perform at least one action based, at least in part, on the remote speech recognition result.

22. The electronic device of claim 18, wherein the at least one processor is further programmed to:
configure the embedded speech recognizer based, at least in part, on the personal information; and
perform at least one action based, at least in part, on the recognized speech produced by the embedded speech recognizer.

* * * * *